United States Patent
Singh et al.

(10) Patent No.: US 12,153,545 B2
(45) Date of Patent: Nov. 26, 2024

(54) RELEVANT CONTENT DOCUMENT COMPARISON

(71) Applicant: Honeywell International Inc., Charlotte, NC (US)

(72) Inventors: Ankit Singh, Apex, NC (US); Jason Halpern, Elkins Park, PA (US); Lakshminarayana Paila, Knoxville, TN (US)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 18/063,593

(22) Filed: Dec. 8, 2022

(65) Prior Publication Data

US 2024/0193127 A1      Jun. 13, 2024

(51) Int. Cl.
   *G06F 16/16*      (2019.01)
   *G06F 8/71*       (2018.01)

(52) U.S. Cl.
   CPC .............. *G06F 16/164* (2019.01); *G06F 8/71* (2013.01)

(58) Field of Classification Search
   CPC ........ G06F 16/164; G06F 8/71; G06F 40/194; G06F 40/197; G06F 9/44536; G06F 16/219; G06F 16/148; G06F 16/1873; G06F 40/154; G06F 16/338
   USPC ....................................................... 707/822
   See application file for complete search history.

(56) References Cited

U.S. PATENT DOCUMENTS

| | | | |
|---|---|---|---|
| 11,880,650 B1 * | 1/2024 | Li | G06F 40/174 |
| 2011/0066626 A1 * | 3/2011 | Dharmalingam | G06F 40/174 |
| | | | 707/758 |
| 2014/0006461 A1 * | 1/2014 | Estes | G06F 40/194 |
| | | | 707/821 |
| 2015/0301994 A1 * | 10/2015 | Kobayashi | G06F 40/143 |
| | | | 715/229 |
| 2018/0075006 A1 * | 3/2018 | Har-Tal | G06F 40/197 |
| 2018/0285326 A1 * | 10/2018 | Goyal | G06F 40/197 |
| 2021/0096552 A1 * | 4/2021 | Onteddu | G05B 19/41875 |
| 2021/0357584 A1 * | 11/2021 | Chen | G06F 40/14 |
| 2023/0186241 A1 * | 6/2023 | Nakamura | G06F 21/64 |
| | | | 713/176 |
| 2023/0409823 A1 * | 12/2023 | Edelstein | G06F 40/194 |

* cited by examiner

*Primary Examiner* — Evan Aspinwall
(74) *Attorney, Agent, or Firm* — Alston & Bird LLP (57) ABSTRACT

A method includes receiving a first document, the first document including multiple sections, each of the multiple sections tagged with metadata indicating a relationship with a department of an organization; receiving a second document, the second document including multiple sections, each of the multiple sections tagged with metadata indicating a relationship with the department of the organization; comparing the sections of the first document tagged with metadata indicating the relationship of the first document with the department with the sections of the second document tagged with metadata indicating the relationship of the second document with the department to determine differences between the department-relevant sections of the first document and the department-relevant sections of the second document; and presenting the differences between the department-relevant sections to a user in a document difference viewer.

20 Claims, 6 Drawing Sheets

RELEVANT CONTENT DOCUMENT COMPARISON

TECHNICAL FIELD

The present disclosure relates generally to document comparison and, more specifically, to automatic document comparison based on metadata tags associated with received data.

BACKGROUND

Document generation and comparison can be a tedious process, despite many documents being reproduced from forms or templates that are routinely accessed to produce new documents therefrom. Further, in certain industries, such as the pharmaceutical and life sciences industries, some documents require annual review by regulators meaning that generated documents must be generated to exacting standards. These exacting standards require careful review across multiple levels and departments of an organization, leading to significant build times for documents of even relatively low levels of import. Hence, inefficiencies in generation and review process should be avoided.

The current disclosure aims to solve some of the issues discussed above by providing systems and methods for generating and comparing relevant portions of documents using metadata tagged to sections of the document, saving users (i.e., generators and reviewers of the documents) time and effort. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY

In one embodiment, a method includes receiving a first document, the first document including multiple sections, each of the multiple sections tagged with metadata indicating a relationship with a department of an organization; receiving a second document, the second document including multiple sections, each of the multiple sections tagged with metadata indicating a relationship with the department of the organization; comparing the sections of the first document tagged with metadata indicating the relationship of the first document with the department with the sections of the second document tagged with metadata indicating the relationship of the second document with the department to determine differences between the department-relevant sections of the first document and the department-relevant sections of the second document; and presenting the differences between the department-relevant sections to a user in a document difference viewer.

In another embodiment, a method includes receiving user login information of a user including a user identity including an assigned department of the user, providing a template document including multiple sections to the user based on a request for the template document from the user, receiving edits to one or more sections of the template document from the user and saving the edited template document as a first document with one or more first document sections, wherein the one or more first document sections that the user changes to differ from the template document are tagged with metadata based on the assigned department of the user, receiving a request to view differences between a second document and the first document, wherein the second document contains multiple second document sections that correspond to the first document sections, and automatically displaying differences between the first document sections tagged with metadata based on the assigned department of the user and a corresponding second document section based on a request to display differences.

In yet another embodiment, a system for comparing documents includes a processing device; and a memory, storing one or more processor-readable instructions that when executed by the processing device cause the processing device to: receive a first document, the first document including multiple sections, each of the multiple sections tagged with metadata indicating a relationship with a department of an organization; receive a second document, the second document including multiple sections, each of the multiple sections tagged with metadata indicating a relationship with the department of the organization; compare the sections of the first document tagged with metadata indicating the relationship of the first document with the department with the sections of the second document tagged with metadata indicating the relationship of the second document with the department to determine differences between the department-relevant sections of the first document and the department-relevant sections of the second document; and present the differences between the department-relevant sections to a user in a document difference viewer.

To the accomplishment of the foregoing and related ends, certain illustrative aspects are described herein in connection with the following description and the appended drawings. These aspects are indicative, however, of but a few of the various ways in which the principles of the claimed subject matter may be employed and the claimed subject matter is intended to include all such aspects and their equivalents. Other advantages and novel features may become apparent from the following detailed description when considered in conjunction with the drawings.

BRIEF DESCRIPTION OF THE DRAWINGS

Embodiments of the disclosure will now be described, by way of example only, with reference to the accompanying drawings in which.

DETAILED DESCRIPTION

Reviews and approvals of documents, especially highly regulated documents, such as, for example, an Annual Product Quality Review (APQR) document can require valuable resources. When a document is generated and later revised, it may be routed through a workflow for review and approval. During this workflow, the people asked to perform the reviews and approval, who may have already reviewed a document and its content, may need to understand the scope and impact of changes to the document. While the document owner may create a summary of their changes, these are often incomplete and inexact. Using tags/metadata to ensure that the correct people focus on area(s) which need their expertise and attention may allow for more efficient and more accurate reviews and approvals.

Metadata can be attached, for example, to documents and portions of documents to reduce some of the inefficiencies of reviewing and approving documents. Most users of a system for generating documents are associated with an account, which may give them at least some access to the digital files on which the document is based and/or the document itself. These accounts are uniquely identifiable and associable with one another and with groups of other accounts. Accordingly, the unique identities of user accounts can be used to tag documents and other files with information related to the account identity and other information. Such information can later be used to match to the sections when the generation and review of portions of a document is required from particular identities matching a requirement (e.g., portions of a document may be required to be generated by a member of a research and development department and to be reviewed by a member of a corporate department, etc.) Using such systems, document generation and review can be made more efficient, saving time and resources within an organization, reducing cycle times for worklows, and making it more likely that reviews and/or approvals are completed correctly without added effort.

Figure 1:
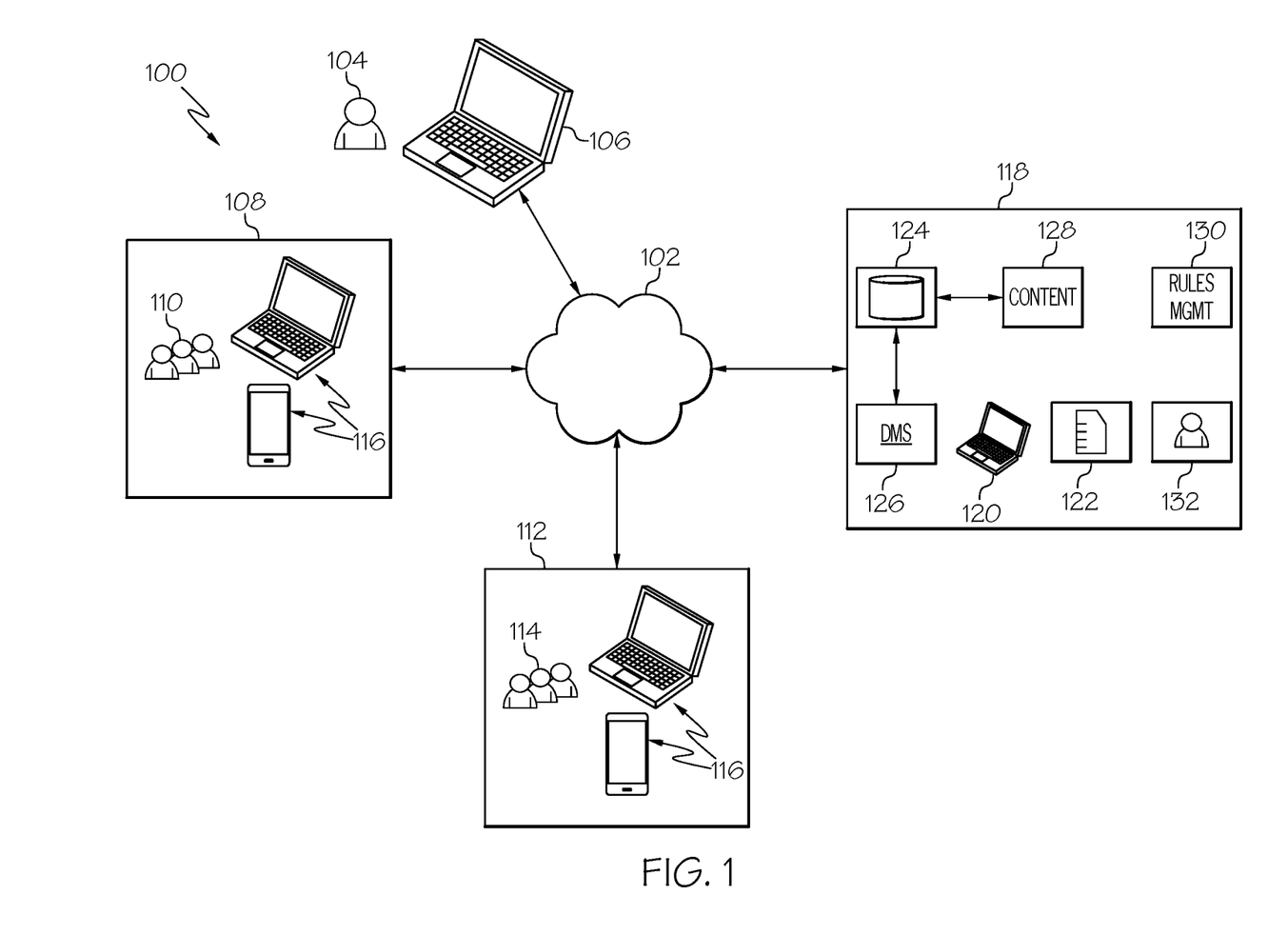
FIG. 1 illustrates a network architecture for generating comparisons between relevant portions of documents according to one or more embodiments shown and described herein.

Referring to FIG. 1, a system 100 for providing context-based full text search results is shown. The system 100 may include a plurality of nodes comprising one or more processing devices (e.g., personal computers, computer networks, personal devices, device networks, etc.) communicatively coupled to a network 102. One or more users may be connected to the network 102. For example, an admin 104 may connect to the network through an admin device 106. In embodiments, users may be grouped via department. For example, a first department 108 may include one or more users 110 and a second department 112 may include one or more users 114. While two departments are shown, it is to be understood that the organization can include any number of departments. The departments may have titles that allude to a function of the department within the organization and the individual users may be grouped into their department based on the same. For example, a quality assurance department, accounting, operations, sales, supply, administration, research and development, human resources, etc. may include individual members performing such functions. The users may connect to the network 102 via user devices 116. A document management server (DMS) 118 may be communicatively coupled to the network 102. The DMS 118 may comprise one or more processing devices 120, one or more memory devices 122, one or more databases 124, a document management system (DMS) module 126, a content module 128, a rules management module 130, and a user profile module 132.

The network 102 may be used to transmit data from the various data processing devices to the server (e.g., a computer of any appropriate configuration) in an appropriate manner. For instance, the data processing device(s) and the server may communicate over a local area computer network (LAN) or a public computer network (e.g., the Internet). In some embodiments, the network 102 may be a private LAN and may be separated from the public Internet by, for example, a firewall. The information associated with a context-based search may be transmitted from the server to one or more of the nodes in any appropriate manner. For instance, the server and a node (e.g., a personal computer; a desktop computer; a laptop computer; a "dumb" terminal) at any location connected to the network may communicate over a computer network, such as a public computer network (e.g., the Internet). A web application may be used to view search results as well.

The one or more processors 120 may communicatively couple with the one or more memory devices to perform one or more of the computer-based methods described herein. The DMS 118 may enable users to manage one or more types of files such as, for example, text-based files, charts, presentations, images, videos, sounds, and other types of files. In some embodiments, the files may include one or more portions of one or more Annual Product Quality Reviews (APQR). An APQR may be a document that fulfills an annual, regulatory requirement for pharmaceutical and life sciences companies. The regulatory requirement may be assigned by one or more external organizations, such as, for example, the United States Food and Drug Administration (FDA) or other organizations. It may be a regulatory requirement for some companies to submit APQRs for a given product line, for a business sector, for the business as a whole, and/or for one or more other purposes. The APQR may store information which may assist a pharmaceutical and/or life sciences company to revalidate its various processes, products, and other facets of its operation. The APQR of one year may be built on previous APQRs and tracking APQRs and their contents over multiple generations may help a company assess operational and administrative changes required in product specifications, manufacturing instructions, control procedures, and with other products and processes.

The DMS 118 may present one or more interfaces including a query function, allowing users to search a connected database and may provide search results using a search engine that can conduct a search of the relevant databases communicatively coupled to a device of the user. In some embodiments, the relevant databases may be automatically selected for a given search based on a profile of the user (as determined, for example, with the user profile module 132). The automatically selected databases may be a default setting based on, for example, a profile of the user (e.g., to which department a user identity is assigned) and the selected databases may be configurable such that a user can decide which databases the user's queries search. In some embodiments, the DMS 118 may include software and/or modules (e.g., software and/or hardware) for recognizing text and/or objects within a body of a document or other file and automatically tagging one or more portions of text and/or objects within the file with one or more metadata tags based on the content of the text and/or object. For example, the recognition software could recognize data within a file related to a corporate department (e.g., based on specific language in the file (e.g., the word "corporate," descriptions of corporate department related information, etc.), based specific objects, etc.) and automatically tag that content with metadata associating the content with the corporate department. This is of course, merely one example of how data may be automatically tagged and other examples are within the scope of the disclosure.

The content module 128 may include one or more caches or containers for storing corporate documents and other content. In embodiments, a content type may define how the content is stored in the content module 128. For example, business logic and methods, database structure, definitions (e.g., schema, field, table, etc.) and associated content of different content types may be stored in different manners, accordingly. Business logic and the methods of the module may be configured to act based on particular content items having been stored in the database (e.g., in the case of a particular search query). For example, content with a characterization of "corporate" or characterized as belonging to a particular department (e.g., quality review, testing, sales, corporate, etc.) may relate to users from the respective department and may be configured to populate search results at a higher rate based on searches from users in that respective department. The content type may include documents which are only visible to users of one or more particular department (e.g., only visible to members of the sales department or only visible to members of the corporate department, etc.) and such content may never be visible in searches from members of departments which do not have access to such labeled content. Content type may be based on a user's role within a department and content may be filtered and/or stored based on such role. For example, content generated (e.g., reports generated) by a researcher may be labeled as such and may be more likely to populate in searches by other researchers even if the researcher is from a separate department. Similarly, content labeled as generated by a user with a sales function may be more likely to populate in searches by other users with a sales function.

The rules management module 130 may administrate one or more document comparison rules as described in greater detail herein. For example, the rules management module 130 may compare documents of a same file type, of a same creator, from creators having a similar role within the organization (e.g., comparing two documents both created by sales personnel). In some embodiments, the rules management module 130 may compare documents based on a text content, heading, or other textual facet of the document (e.g., two different documents with a heading "Annual Sales Data"). In some embodiments, the rules management module 130 may be configured to administrate one or more document comparison rules based on, for example, automatically recognized text or objects within a body of the document. The automatically recognized text could be based on textual recognition or object recognition software included in the system, for example.

The user profile module 132 may collect or receive user profile information from the various users of the systems. In some embodiments, the user profile information includes information about the user such as the user's department, which documents, type of documents, and sections of documents a user has interacted with in the past, and other information about the user and the user's use of documents stored within the system. User profile information can include, for example, information related to documents opened, documents read (e.g., by determining a length that a particular document is open and active on a user's screen, etc.), documents interacted with, documents drafted and information about the documents drafted (e.g., length, word choice, etc.), recent searches by the user, and other information. In some embodiments, the user may update information associated with his or her profile individually. For example, a user may input his or her department when creating his or her own user profile (e.g., by selecting a department from amongst various departments in a drop down) or may assign one or more filters temporarily to his or her profile to filter document comparison results. For example, if a user knows that they do not wish to receive document comparison results including documents from before a particular date (e.g., May 1, 2020), the user could add such restriction to their profile. User profile information may be collected and stored in a database, for example, the database(s) 124. Additionally, the user profile module 132 may assign a correlation between a particular document comparison result in a set of document comparisons as of particular interest to a given user profile with a correlation number, which correlation number may be used to update future comparisons. The user profile correlation number may quantify a correlation between multiple comparison results and various individual comparison results.

Figure 2:
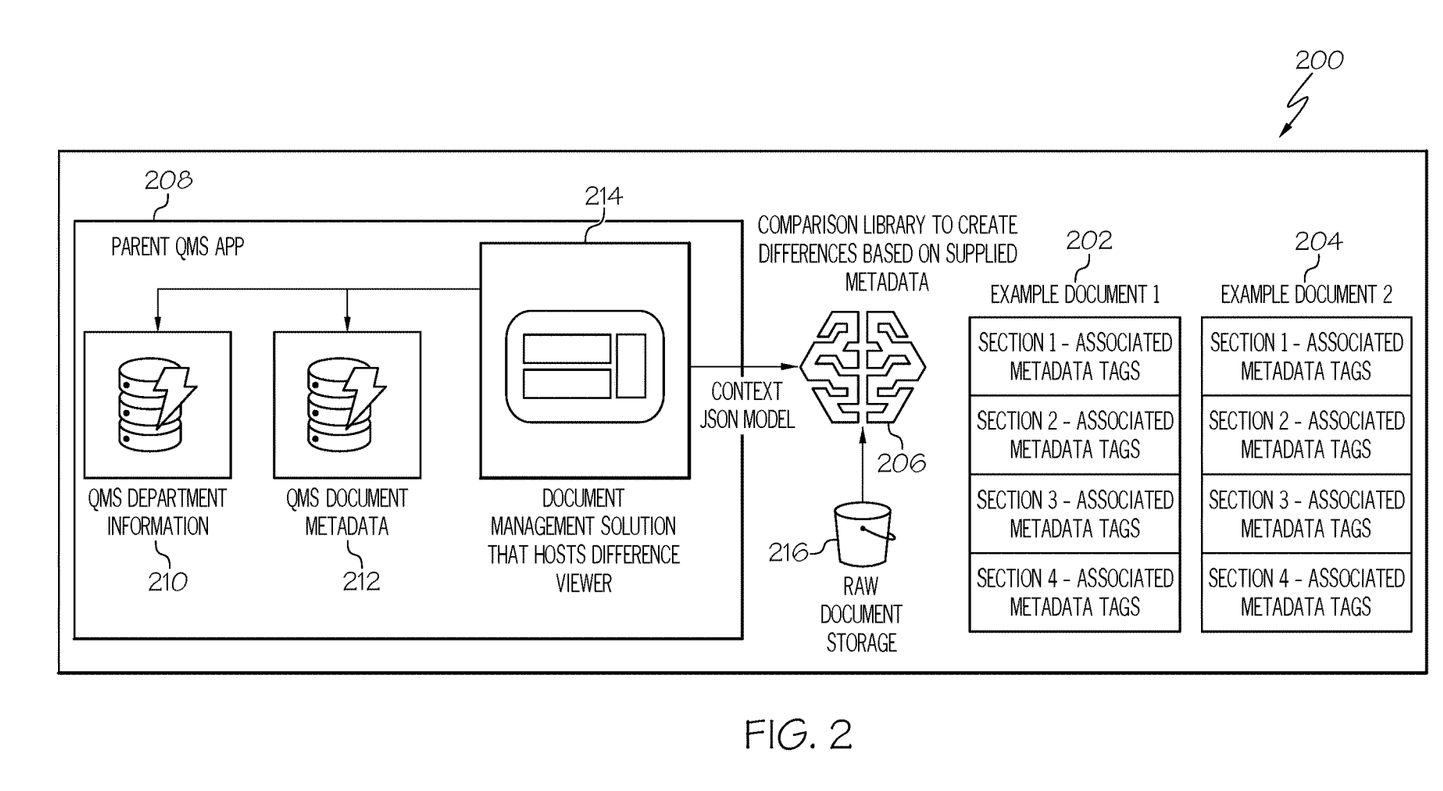
FIG. 2 illustrates further details of a system for generating comparisons between relevant portions of documents.

FIG. 2 shows an exemplary architecture for performing context-based document comparison. The system 200 includes a first example document 202 and a second example document 204. The first example document and the second example document 204 can be stored in a raw document storage 216 in any file format (e.g., .doc, .docx, .pdf, .ppt, .xcl, .jpg etc.) and the raw document storage may be accessible by a comparison library 206. The comparison library 206 may be a library of stored differences between documents (e.g., the first example document 202 and the second example document 204) based on supplied metadata. The metadata may be supplied, for example, by one or more users of the system or may be automatically assigned based on one or more factors (e.g., a user profile that is used to access a document may automatically stamp a document with one or more metadata tags, etc.) The system 200 further includes a parent quality management system (QMS) app 208, which QMS app 208 may include a QMS department information database 210, a QMS document metadata database 212, and a document management solution (DMS) difference viewer 214.

In some embodiments, the QMS app 208 may include one or more repositories and/or modules. For example, the QMS app 208 may include a rules repository configured to store data comparison rules for comparing data between one or more documents. The data comparison rules may, for example, cause portions of a comparison result between two documents to be displayed on a display of a user based on a user identity of a creator and/or an editor of the documents being compared. For example, if the two documents being compared are both generated and/or edited by a user from a Complaints department (as determined, for example, by an access and identity module), then only differences germane to members of the Complaints department may be shown with the document comparison tool. For example, only differences in the Quality/Complaints sections of two compared documents including Quality/Complaints sections of for example, Annual Product Quality Review (APQR) documents may be shown. In some embodiments, the rules repository may include one or more rules for automatically filtering differences shown using the difference viewer based on a user id of a user viewing the differences. For example, if the a comparison result document showing the differences between two documents is opened and viewed by someone from a Quality Approver department, then the Quality Approver department member may only see differences relevant to quality sections (or other sections that would be germane to a Quality Approver). If the same comparison result document is opened and viewed and/or created by someone from a Supply Chain department, the person from the Supply Chain department viewing the comparison result document may only be shown differences pertinent to the Supply Chain department (e.g., parts/manufacturing, etc.) within the document comparison result. Additionally, the rules repository may include rules for comparing document sections based on tags applied to the document and its content and for comparing similarly tagged sections of compared documents and their content. Based on the tagged content, differences can be shown by comparing the similarly tagged sections of the document. The rules repository can include rules for comparing contemporaneously prepared sections of documents, documents which are generationally related, and documents which may be otherwise related. Example tags for sections inside the document may include tags based on department, process, event time stamps, etc.

The QMS app 208 may further include a rules management module configured to manage the rules repository by managing the data comparison rules stored in the rules repository. The rules management module may, for example, update one or more of the rules stored in the rules repository based on, for example, a change to one or more of the document comparison requirements for the system. Changes to document comparison rules may be required, for example, based on updated requirements for comparisons between portions of a result between two documents that may be displayed on a display of a user based on a user identity of a creator and/or an editor of the documents being compared. For example, if the functions of two separate departments are changed such that the functions overlap, the rules management module may update the rules repository to include a rule that causes portions of the document comparison tool to display document comparisons between the two compared documents to members of both the departments. As another example, the rules management module could update a rules repository such that two documents including sections which have been generated by users from the same department are accessible by users from multiple departments if necessary.

The QMS department information database 210 may store information related to a particular department. For example, the QMS department database may store information related to the identities of users within a particular department and any documents, document sections, and document features stored, generated, and saved by users of a particular department such that such document features can be tagged, stored, and recalled and/or compared with documents having such features in the future. The QMS department information database 210 may be a database within the QMS app 208 or may be external to the QMS app 208 and accessible by the QMS app 208. For example, the QMS department information database 210 may be stored on an external server that is connected (e.g. via the network 102 of FIG. 1) to the QMS app 208. The QMS department information database 210 may be accessible, for example, using the devices 116.

The QMS document metadata database 212 may store metadata associated with one or more documents stored in QMS app 208 or elsewhere. The QMS document metadata database 212 may be accessible by the users from the various departments and documents stored in the QMS may have their metadata stored in the QMS document metadata database 212 separately and/or along with the documents stored in the QMS such that the QMS document metadata database 212 is a redundant database. In some embodiments, the QMS document metadata database 212 makes the metadata available to the QMS app 208. The metadata tagged to the documents in the QMS may be automatically tagged to the documents or sections/portions and/or may be manually tagged to the documents or sections/portions thereof. For instance, if a document is generated by a user having a particular department associated with their profile, metadata associated with the profile may be automatically attached to the document (e.g., if a user from a Quality Assurance department generates a document, edits a document, etc.

then that document or relevant portion thereof (e.g., the portion generated, edited, etc.) may be automatically tagged with metadata indicating that the document or relevant portion was generated, edited, etc. by the user from the particular document. In some embodiments, the metadata may include a time of generation (e.g., a timestamp) and the metadata may be used to compare documents based on the time stamp. For example, documents from subsequent years (e.g., in the case of an annually required document (e.g., APQR)) may be subsequently compared based on their stamped metadata. Such data would be stored in the QMS document metadata database 212 and accessible based on connection thereto.

Figure 3:
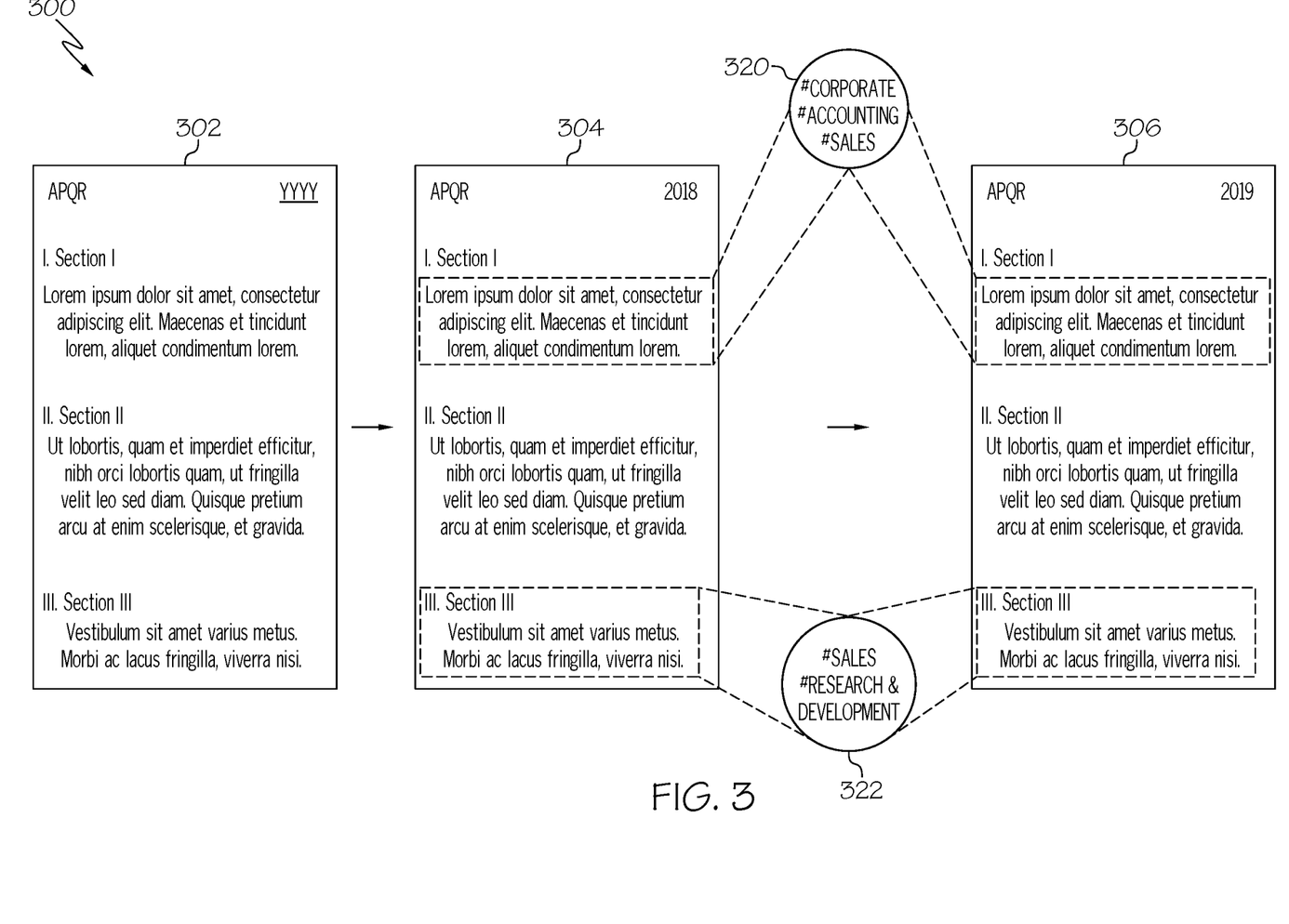
FIG. 3 illustrates compared documents generated from a template.

Referring to FIG. 3, a set of documents 300 is shown. The example documents in FIG. 3 are Annual Product Quality Reviews (APQR), but any type of document that is comparable with another document of the same or similar type is within the scope of the present disclosure. For example, a .pdf file could be compared with a .doc file. APQR documents may present particular challenges during drafting, editing, and review because the documents may include content from multiple different systems of records, including external vendors, may contain many different documents/pieces of content, and hence determining changes between various versions of a document may be particularly difficult. FIG. 3 includes a document template 302, a previous document 304, and a subsequent document 306. In the particular example depicted, the previous document 304 and the subsequent document 306 are related in that they are annual reports that generally report the same or similar information. Accordingly, the previous document 304 and the subsequent document will contain much the same or similar information under many of the same or similar headings. The previous document 304 contains information describing operations and administration for the year previous to the year's worth of information described in the subsequent document 306. Both the previous document 304 and the subsequent document 306 may generally follow guidelines and structure defined in the template 302. While the previous document 304 and the subsequent document 306 follow the template 302, it is understood that not all document comparisons within the scope of this document follow a template, and not all documents compared using the tools and methods described herein are related. That is, the document comparison tools and methods described herein could be used to compare unrelated documents having similar metadata tags (e.g., in the case of erroneously assigned tags, etc.)

As shown in the example of FIG. 3, the previous document 304 is an APQR from 2018. The previous document 304 contains multiple sections and depicted in FIG. 3 are a first section, a second section, and a third section. Similarly, the subsequent document 306 contains multiple sections and depicted in FIG. 3 are a first section, a second section, and a third section. The subsequent document 306 is an APQR from 2019.

As depicted in FIG. 3, the documents (i.e., all of the template 302, the previous document 304, and the subsequent document 306) can be tagged with metadata. The documents can be tagged with metadata 320, 322 assigning any classification to the documents. For example, the documents could be tagged with metadata based on a creation date, an edit date, a creator identity, an editor identity, a requirement for submission date (i.e., the date that a particular document is due for submission (e.g., to an external regulatory agency)), a department identification of a creator and/or an editor (e.g., corporate, sales, accounting, etc.) The metadata tags attached to a particular document can be saved and the saved tags can be used to compare similar documents by the QMS app 208 (for example, for view in the DMS difference viewer app 214). Still referring to FIG. 3, the documents themselves can be tagged with appropriate metadata and the individual sections of the documents can be tagged with metadata. For example, a first section could be tagged with metadata tags, a second section could be tagged with metadata tags, and a third section could be tagged with metadata tags. The tags attached to the document as a whole or to the individual sections could apply to a department such that the tagged section of a document is presented in a difference viewer to a user from the tagged department when the user from the tagged department views a comparison of the tagged documents in a difference viewer. For example, a member of a corporate department could login to a difference viewer application while reviewing an APQR document in advance of publishing the APQR. The corporate department member could automatically view differences between the previous document 304 and the subsequent document 306 and sections thereof using the difference viewer based on the metadata tagged to the document. For example, the user may automatically be shown differences between entire documents tagged with their own department or differences between individual sections tagged with their own department. Multiple tags can be assigned to any particular document or section such that the document and/or section could be automatically shown to multiple departments in the difference viewer based on the metadata tags attached thereto. For instance, differences between documents and/or sections tagged with #corporate, #accounting, and #sales would be shown to members of each of the #corporate, #accounting, and #sales departments based on the rules developed in a rules engine, for example, the rules management module 130.

In some embodiments, the APQR may include content that may be used in multiple documents and/or subsets of content that may be used in multiple documents. For example, under one exemplary heading of an exemplary chapter, the APQR may include sales data for a particular product and the same sales data may be used for under a second exemplary heading of a second exemplary chapter. The various instances of the sales data can be tracked (e.g., using hashtags) together such that when one instance of the data is edited, reviewed, etc. the other instances can be flagged for review as well, ensuring that all instances of the data are reviewed appropriately such that there is no instance of the sales data that is dissonant with other instances of the sales data. This type of comparison process could be completed automatically, for example, via text recognition and the recognized text may be automatically tagged with one or more tags for review and/or flagged for tagging by a reviewer/editor of the document.

Figure 4:
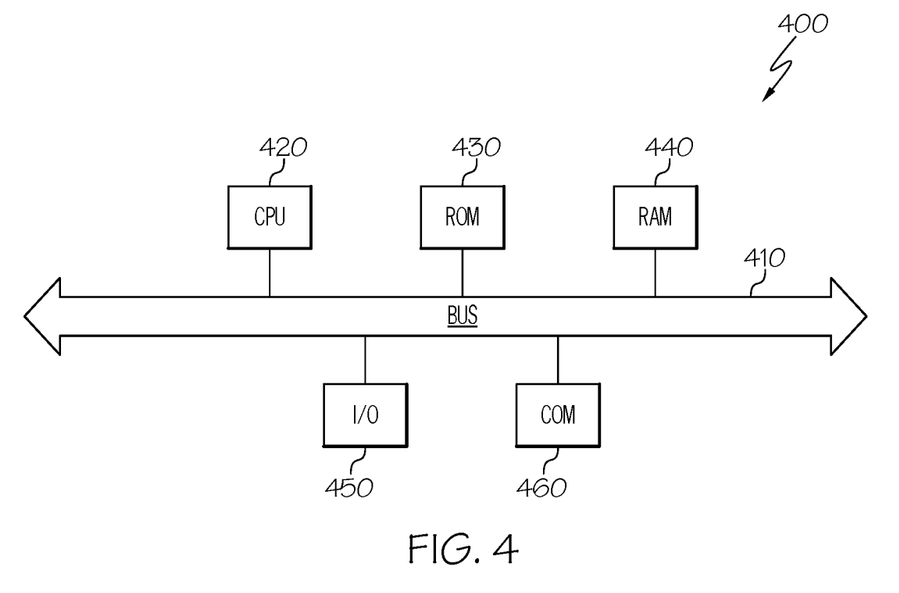
FIG. 4 illustrates an exemplary computing environment for the systems and methods described herein.

FIG. 4 is a simplified functional block diagram of a computing system 400 that may be configured for carrying out one or more of the steps, programs, and/or executing techniques described herein, according to exemplary embodiments of the present disclosure. Specifically, in one embodiment, any of the modules of the system 100 may be an assembly of software and/or hardware including, for example, a data communication interface 460 for packet data communication. The platform may also include a central processing unit ("CPU") 420, in the form of one or more processors, for executing program instructions. The platform may include an internal communication bus 410, program storage, and data storage for various data files to be processed and/or communicated by the platform such as ROM 430 and RAM 440, although the system 400 may receive programming and data via network communications. The system 400 also may include input and output ports 450 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

Any suitable system infrastructure may be put into place to allow for the assessment of models monitoring devices. FIG. 4 and the following discussion provide a brief, general description of one example of a suitable computing environment in which certain embodiments and aspects thereof the present disclosure may be implemented. In one embodiment, any of the disclosed systems, methods, and/or graphical user interfaces may be executed by or implemented by a computing system consistent with or similar to that depicted in FIG. 4. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

The general discussion of this disclosure provides a brief, general description of a suitable computing environment in which the present disclosure may be implemented. In one embodiment, any of the disclosed systems, methods, and/or graphical user interfaces may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure also may be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

Figure 5:
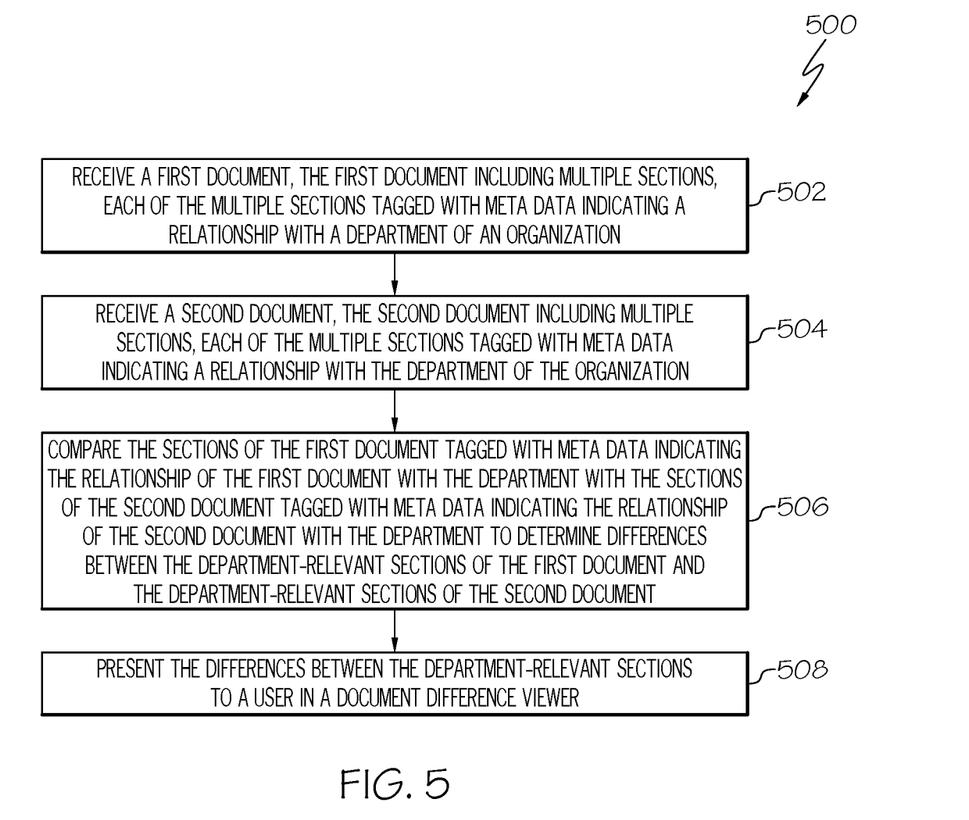
FIG. 5 illustrates a method for contextually comparing documents.

Referring to FIG. 5, a method 500 for presenting differences between documents or sections or objects therein to a user is shown. It is to be understood that the method 500 is not limited to the steps and features explicitly listed therein and that modifications including additional or fewer steps and/or features are within the scope of the various embodiments described herein.

At step 502, the system may receive a first document and the first document may include multiple sections. Each of the multiple sections may be tagged with metadata indicating a relationship between the document and a department of an organization. For instance, the document may have been generated by a user of the particular department, may require review by one or more users within the department, may concern information relevant to the department, or other reason. The first document may be a text-based document, graphical document (e.g., image file, video file, etc.) or some other type of file or combination of files. In some embodiments, the sections of the document include objects which may have been individually tagged with metadata indicating a relationship with the department. With reference to FIG. 1, for example, the document may have been created by users of a first department 108. The document may have been tagged automatically based on the content therein (e.g., by the QMS app 208) or may have been tagged manually by the department user. In some embodiments, the document is tagged by multiple users with multiple tags. For example, the members of a corporate department may tag a particular section as relevant to a corporate department and the members of an accounting department may tag a section as relevant to the accounting department.

At step 504, the system may receive a second document, the second document including multiple sections, each of the multiple sections tagged with metadata indicating a relationship with the department of the organization. Each of the multiple sections of the second document may be tagged with metadata indicating a relationship between the second document and a department of an organization. For instance, the second document may have been generated by a user of the particular department, may require review by one or more users within the department, may concern information relevant to the department, or other reason. Similar to the first document, the second document may be a text-based document, graphical document (e.g., image file, video file, etc.) or some other type of file or combination of files. In some embodiments, the sections of the second document include objects which may have been individually tagged with metadata indicating a relationship with the department. With reference to FIG. 1, for example, the second document may have been created by users of a first department 108. The document may have been tagged automatically based on the content therein (e.g., by the QMS app 208) or may have been tagged manually by the department user. In some embodiments, the document is tagged by multiple users with multiple tags. For example, the members of a corporate department may tag a particular section as relevant to a corporate department and the members of an accounting department may tag a section as relevant to the accounting department.

At step 506, sections or portions of the first document tagged with metadata indicating the relationship of the first document with the department may be compared with the sections of the second document tagged with metadata indicating the relationship of the second document with the department to determine differences between the department-relevant sections of the first document and the department-relevant sections of the second document. This may provide a convenient comparison automatically based on the metadata tags attached to each of the sections. In embodiments, the text in the various sections may be compared, the objects (e.g., charts, graphs, etc.) may be compared, images in the documents may be compared, etc. The relevant sections may be identified automatically based on the metadata tags attached thereto and the similarly tagged sections may be automatically compared. For example, two sections in the corresponding documents tagged with a #corporate tag may be compared. In some embodiments, where a section is tagged automatically and/or manually, either of the manual and/or automatic tags may take precedence over another of the tags in the case of, for example, a discrepancy between the tags based on rules stored in the rules management module, for example. For instance, if a user tags a particular section as pertaining to a certain department and the system causes the section to be automatically tagged as not relevant to a particular department (e.g., based on textual recognition of the content of the section), either of the manual tag or the automatic tag may take precedence.

At step 508, the differences between the department-relevant sections may be presented to a user in a document difference viewer. The document difference viewer may be, for example, a portion of a QMS app such as the QMS app 208 of FIG. 2 and may be displayed on a device accessible by the user. For example, a personal electronic device, a computer, etc. With reference to FIG. 1, for example, the differences could be displayed on the devices 116. The differences can include differences in text, objects, or other data within the compared files. In some embodiments, the differences between the documents may be highlighted within the document difference viewer. For example, the differences may be called out in a different format (e.g., font, color, etc.) or indicated as differences in another way, for example, the differences may be circled, red-lined, highlighted, etc. In some embodiments, the document differences may be stored separately in a separate file and may be saved for future comparisons. In some embodiments, the differences may be accessible by a user based on an access level of the user. For instance, members of a particular department may be prevented from accessing one or more differences between documents for information that is not relevant to their department. As an example, members from an accounting department may not be able to access information related to a corporate department, etc.

Figure 6:
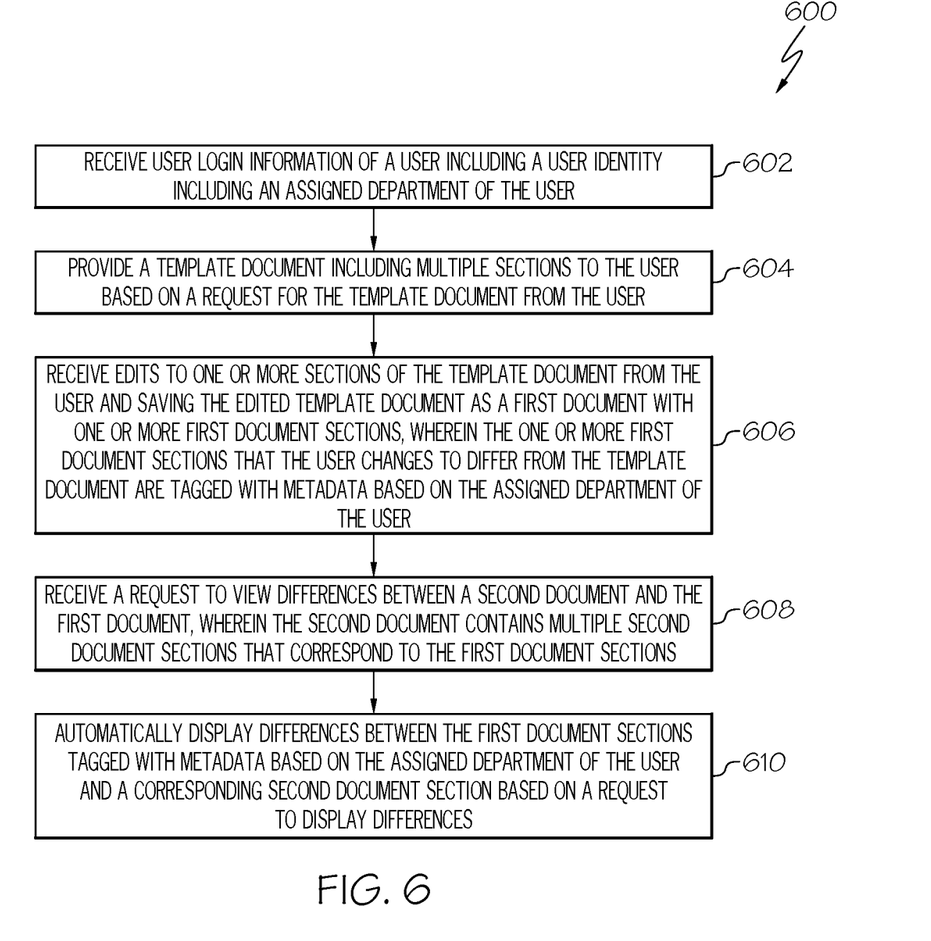
FIG. 6 illustrates a second method for contextually comparing documents.

Referring to FIG. 6, a method 600 for automatically displaying differences between a first document and a second document is shown. It is to be understood that the method 600 is not limited to the steps and features explicitly listed therein and that modifications including additional or fewer steps and/or features are within the scope of the various embodiments described herein.

At step 602, a system may receive user login information of a user including a user identity including an assigned department of the user. The user may login, for example, to a network such as, for example, the network 102 of FIG. 1 and may access a document management server such as the DMS 118 to access content stored in the DMS 118 (e.g., in the content module 128). The user login information can include specific details about the user, for example, the user's assigned department, the user's level of access (e.g., to which portions of data the user has access), and other information. The login information may include, for example, a user id and a password. In some embodiments, the user information may be encrypted or include additional security protocols.

At step 604, a template document including multiple sections may be provided to the user based on a request for the template document from the user. The template could be, for example, a template for creating and/or editing an APQR. In some embodiments, the template may be stored, for instance in a document management system or other file server storing documents accessible by users of the system. The template can contain multiple sections that are tagged for entry by a user of a particular department. For example, a research and development section may be tagged for input from members of a research and development department and other members, such as, for example, a member of a corporate department, a member of an accounting department, etc. The various sections could be tagged for review and/or input from various users based on the function of the section. For example, if a research and development section has to do with the budget of the research and development department, it may be tagged for review by one or more members of a research and development department, one or more members of a corporate department, and/or one or more members of an accounting department. However, if a particular section does not pertain to various departments, it might not be tagged with metadata for input and/or review by such department. To continue with the example, if the research and development section did not have anything to do with finances (e.g., it was simply the success of a particular pharmaceutical product) it might only be tagged for input/review from the research and development department and/or the corporate department.

At step 606, the system may receive edits to one or more sections of the template document from the user and may receive one or more commands to save the edited template document as a first document with one or more first document sections. The one or more first document sections that the user changes to differ from the template document may be tagged with metadata based on the assigned department of the user. For example, if a user in the sales department edits a section, that section may be tagged as having been edited by a member of the sales department. This is so that later, when the document is compared, the particular sections including the metadata that the document has been edited by a member of the corporate department can be easily recalled, accessed, and compared with other documents.

At step 608, the system may receive a request to view differences between a second document and the first document, wherein the second document contains multiple second document sections that correspond to the first document sections. The second document sections may have been tagged similarly to the first document sections. The request may be generated by a user (i.e., actively) and/or may be automatically generated by the system, for example, when the second document is created, opened, edited, etc. In some embodiments, when a user accesses the second document, the changes may automatically be requested in anticipation that the user will want to know the differences between the first document and the second document. The system may access, for example, the raw document storage, the department information database, and/or the document metadata database, for example, when the request is received to view differences between the second document and the first document.

At step 610, the system may automatically display differences between the first document sections tagged with metadata based on the assigned department of the user and a corresponding second document section based on a request to display differences. The displayed differences may be highlighted from the various other text of a document so that it is readily apparent to a user. In some embodiments, the displayed differences can be filtered based on, for example, a type of review/approval being performed (e.g., a level of review/approval within a review/approval chain, a department of the reviewer/approver, etc.), a user's role, a user's certification(s), a user title, and based on other filters.

It is to be appreciated that 'one or more' includes a function being performed by one element, a function being performed by more than one element, e.g., in a distributed fashion, several functions being performed by one element, several functions being performed by several elements, or any combination of the above.

Moreover, it will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

The systems, apparatuses, devices, and methods disclosed herein are described in detail by way of examples and with reference to the figures. The examples discussed herein are examples only and are provided to assist in the explanation of the apparatuses, devices, systems, and methods described herein. None of the features or components shown in the drawings or discussed below should be taken as mandatory for any specific implementation of any of these the apparatuses, devices, systems or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context.

The hardware used to implement the various illustrative logics, logical blocks, modules, and circuits described in connection with the aspects disclosed herein can include a general purpose processor, a digital signal processor (DSP), a special-purpose processor such as an application specific integrated circuit (ASIC) or a field programmable gate array (FPGA), a programmable logic device, discrete gate or transistor logic, discrete hardware components, or any combination thereof designed to perform the functions described herein. A general-purpose processor can be a microprocessor, but, in the alternative, the processor can be any processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration. Alternatively, or in addition, some steps or methods can be performed by circuitry that is specific to a given function.

In one or more example embodiments, the functions described herein can be implemented by special-purpose hardware or a combination of hardware programmed by firmware or other software. In implementations relying on firmware or other software, the functions can be performed as a result of execution of one or more instructions stored on one or more non-transitory computer-readable media and/or one or more non-transitory processor-readable media. These instructions can be embodied by one or more processor-executable software modules that reside on the one or more non-transitory computer-readable or processor-readable storage media. Non-transitory computer-readable or processor-readable storage media can in this regard comprise any storage media that can be accessed by a computer or a processor. By way of example but not limitation, such non-transitory computer-readable or processor-readable media can include random access memory (RAM), read-only memory (ROM), electrically erasable programmable read-only memory (EEPROM), FLASH memory, disk storage, magnetic storage devices, or the like. Disk storage, as used herein, includes compact disc (CD), laser disc, optical disc, digital versatile disc (DVD), floppy disk, and Blu-ray Disc™, or other storage devices that store data magnetically or optically with lasers. Combinations of the above types of media are also included within the scope of the terms non-transitory computer-readable and processor-readable media. Additionally, any combination of instructions stored on the one or more non-transitory processor-readable or computer-readable media can be referred to herein as a computer program product.

Many modifications and other embodiments of the inventions set forth herein will come to mind to one skilled in the art to which these inventions pertain having the benefit of teachings presented in the foregoing descriptions and the associated drawings. Although the figures only show certain components of the apparatus and systems described herein, it is understood that various other components can be used in conjunction with the supply management system. Therefore, it is to be understood that the inventions are not to be limited to the specific embodiments disclosed and that modifications and other embodiments are intended to be included within the scope of the appended claims. Moreover, the steps in the method described above can not necessarily occur in the order depicted in the accompanying diagrams, and in some cases one or more of the steps depicted can occur substantially simultaneously, or additional steps can be involved. Although specific terms are employed herein, they are used in a generic and descriptive sense only and not for purposes of limitation.

It is intended that the specification and examples be considered as exemplary only, with a true scope and spirit of the disclosure being indicated by the following claims.

What is claimed is:

1. A method comprising:
    receiving by a processor, a first document from one or more users of an organization, the first document including multiple sections, each of the multiple sections tagged with metadata indicating a relationship with a department of the organization;
    receiving by the processor, a second document from the one or more users of the organization, the second document including multiple sections, each of the multiple sections tagged with metadata indicating a relationship with the department of the organization;
    automatically comparing by the processor based on one or more rules, the sections of the first document tagged with first metadata provided by a user, wherein the first metadata indicating the relationship of respective sections of the first document with the department, to the sections of the second document tagged with second metadata provided by the user, wherein the second metadata indicating the relationship of respective sections of the second document with the department to identify any differences between department-relevant sections of the first document and department-relevant sections of the second document; and
    presenting by the processor based on a request by the user, the differences between the department-relevant sections to a user in a document difference viewer.

2. The method of claim 1, wherein the first metadata and the second metadata are tagged to the first document and the second document based on a setting of a user profile of the user who created or edited a section of the document, wherein the setting includes information related to an assigned department of the user.

3. The method of claim 2, wherein the assigned department of the user is any one of quality assurance, accounting, operations, sales, supply, administration, research and development, and human resources.

4. The method of claim 1, further comprising: tagging one or more sections of the first document and one or more sections of the second document with one or more metadata tags provided by the user for a department that is not an assigned department of the user.

5. The method of claim 1, wherein:
    the multiple sections of the first document include multiple first document tasks, each of the first document multiple tasks being tagged with the first metadata;
    the multiple sections of the second document include multiple second document tasks, each of the second document multiple tasks being tagged with the second metadata; and
    the first document multiple tasks are compared with the second document multiple tasks based on the metadata tagged to the first document multiple tasks and the second document multiple tasks.

6. The method of claim 5, wherein the first metadata and the second metadata tagged to the first document multiple tasks and the second document multiple tasks includes a relevant department for the first document multiple tasks and the second department multiple tasks.

7. The method of claim 6, wherein the comparison by the processor between the first document multiple tasks and the second document multiple tasks are provided to the user based on a department of the user.

8. The method of claim 5, wherein after the comparison, only the differences between the first document multiple tasks and the second document multiple tasks that are tagged with metadata indicating the same department as the user are presented to the user.

9. The method of claim 1, wherein the first document and the second document are annual product quality reviews.

10. The method of claim 1, wherein the first document and the second document are filled versions of a document template.

11. The method of claim 10, wherein the second document is generated subsequently to the first document and the one or more sections of the second document are tagged with the second metadata relating the one or more sections of the second document directly to one or more sections of the second document.

12. A method comprising:
    receiving by a processor, user login information of a user including a user identity including an assigned department of the user;
    providing by the processor, a template document including multiple sections to the user based on a request for the template document from the user;
    receiving by the processor, edits to one or more sections of the template document from the user and saving the edited template document as a first document with one or more first document sections, wherein the one or more first document sections that the user changes to differ from the template document are tagged with first metadata based on the assigned department of the user;
    receiving by the processor, a request to view differences between a second document and the first document, wherein the second document contains multiple second document sections that correspond to the first document sections; and
    automatically displaying by the processor differences between the first document sections tagged with metadata based on the assigned department of the user and a corresponding second document section based on a request to display differences.

13. The method of claim 12, wherein:
    the multiple sections of the first document include multiple first document tasks, each of the first document multiple tasks being tagged with the first metadata;

the multiple sections of the second document include multiple second document tasks, each of the second document multiple tasks being tagged with the second metadata; and the first document multiple tasks are compared with the second document multiple tasks based on the first metadata and the second metadata tagged to the first document multiple tasks and the second document multiple tasks.

14. The method of claim 12, wherein the first document and the second document are annual product quality reviews.

15. The method of claim 12, wherein the metadata is tagged to the first document and the second document based on a setting of a user profile of the user who created or edited a section of the document, wherein the setting includes information related to an assigned department of the user.

16. The method of claim 12, further comprising: tagging one or more sections of the first document and one or more sections of the second document with one or more metadata tags for a department that is not an assigned department of the user.

17. The method of claim 12, wherein the second document is generated subsequently to the first document and the one or more sections of the second document are tagged with the second metadata relating the one or more sections of the second document directly to one or more sections of the second document.

18. A system for comparing documents comprising:
a processing device; and
a memory, storing one or more processor-readable instructions that when executed by the processing device cause the processing device to:

receive a first document from one or more users of an organization, the first document including multiple sections, each of the multiple sections tagged with metadata indicating a relationship with a department of an organization;

receive a second document from the one or more users of the organization, the second document including multiple sections, each of the multiple sections tagged with metadata indicating a relationship with the department of the organization;

automatically compare based on one or more rules, the sections of the first document tagged with first metadata provided by a user indicating the relationship of the first document with the department with the sections of the second document tagged with second metadata provided by the user, indicating the relationship of the second document with the department to determine differences between the department-relevant sections of the first document and the department-relevant sections of the second document; and present based on a request by the user, the differences between the department-relevant sections to a user in a document difference viewer.

19. The system of claim 18, wherein the first metadata and the second metadata are tagged to the first document and the second document based on a setting of a user profile of the user who created or edited a section of the document, wherein the setting includes information related to an assigned department of the user.

20. The system of claim 19, wherein the assigned department of the user is any one of quality assurance, accounting, operations, sales, supply, administration, research and development, and human resources.

* * * * *